Sept. 8, 1942.  C. F. WAGNER ET AL  2,295,312
SURGE MEASURING INSTRUMENT
Filed July 15, 1939   4 Sheets-Sheet 1

WITNESSES:
E. A. McCloskey
C. L. Freedman

INVENTORS
Charles F. Wagner and
Gilbert D. McCann Jr.
BY
ATTORNEY

Sept. 8, 1942.   C. F. WAGNER ET AL   2,295,312
SURGE MEASURING INSTRUMENT
Filed July 15, 1939   4 Sheets-Sheet 2

WITNESSES:

INVENTORS
Charles F. Wagner and
Gilbert D. McCann Jr.
BY
ATTORNEY

Patented Sept. 8, 1942

2,295,312

UNITED STATES PATENT OFFICE 2,295,312

SURGE MEASURING INSTRUMENT

Charles F. Wagner, Swissvale, and Gilbert D. McCann, Jr., Edgewood, Pa., assignors to Westinghouse Electric & Manufacturing Company, East Pittsburgh, Pa., a corporation of Pennsylvania Application July 15, 1939, Serial No. 284,604

32 Claims. (Cl. 175—183)

This invention relates to measuring instruments, and it has particular relation to measuring instruments for measuring the characteristics of rapid phenomena such as electrical surges.

Most measuring instruments are designed to measure either static conditions or conditions which vary slowly. When it is desired to measure the wave form or characteristics of high speed phenomena, it is possible to employ a cathode ray oscillograph, but such instruments are expensive, delicate and difficult to adjust and operate.

In order to measure the wave form of electrical surges and other high speed quantities, we provide a measuring instrument wherein a plurality of magnetic bodies having high magnetic retentivities are moved through a magnetic field, the intensity of which is controlled by the electrical surge or other quantity to be measured. After an operation of our measuring instrument, the residual induction of each magnetic element is measured and provides an indication of the magnitude of the electrical surge or other quantity at the instant the magnetic element was introduced into the magnetic field. Preferably the magnetic elements are mounted around the periphery of a rotatable disc or drum and the magnetic field is produced by coils positioned adjacent one point in the travel of the periphery of the disc or drum. To provide a greater range of our instrument, we may position two or more rows of magnetic elements around the periphery of the disc or drum and subject each row of magnetic elements to a magnetic field of different intensity of control by the electrical surge or other quantity to be measured. In order to obtain data concerning a series of electrical surges, a plurality of discs or drums each provided with a row of magnetic elements may be rotated at different rates relative to magnetic fields controlled by the electrical surges. The disc or drum rotating at a slow speed furnishes an indication of the number of electrical surges occurring during a measuring operation and the disc or drum rotating at a higher speed provides data showing the specific characteristics of one of the electrical surges.

In a modification of our invention an indication of the area enclosed by a curve corresponding to an electrical surge or other quantity to be measured is provided. To this end the voltage drop across a resistor is employed for sending a current through a winding having high inductance. By placing a magnetic element of high magnetic retentivity within the inductive winding, an indication of the maximum current passing through the inductance is obtained. This, in turn, is substantially proportional to the integral of the surge current passing through the resistor with respect to time.

It is, therefore, an object of our invention to provide means for moving a plurality of magnetic elements having high magnetic retentivities through a magnetic field controlled by a quantity to be measured.

It is another object of our invention to provide an improved method for measuring characteristics of an electrical surge.

It is a still further object of our invention to provide means for indicating the integral relative to time of current in an electrical surge.

Other objects of our invention will be apparent from the following description taken in conjunction with the accompanying drawings, in which.

Figures 1, 2:
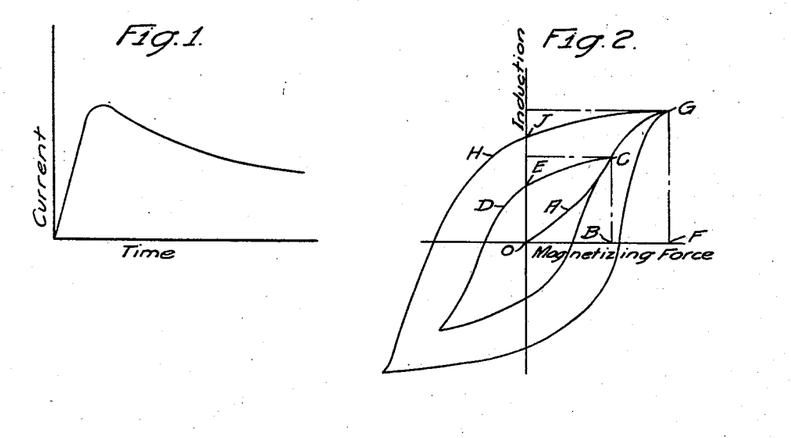
Figure 1 is a diagramatic view of a curve showing an electrical surge wherein ordinates represent current and abscissae represent time.
Fig. 2 is a graphical view of hysteresis loops for magnetic material of high magnetic retentivity wherein abscissae represent magnetizing force and ordinates represent residual induction or retained magnetism.

Referring to the drawings, Figure 1 shows a curve representative of an electrical surge in which current is represented by ordinates and time is represented by abscissae. In the specific curve illustrated in Fig. 1, the current rises very rapidly to a maximum or peak value and subsequently drops at a reduced rate. This is typical of a large number of electrical surges or impulses encountered in practice. As an indication of the time factors to be considered in measuring a surge of the type illustrated in Fig. 1, the surge may reach its maximum or peak value in a matter of microseconds. Most measuring instruments are incapable of measuring current changes of this rapidity.

If it were possible to subject magnetic elements having high magnetic retentivities to magnetic fields corresponding in magnitude to the magnitude of the electrical surge at various points on the curve shown in Fig. 1, the retained magnetisms or residual inductances of the magnetic elements would be measures of the value of the electrical surge at the points measured. This may be understood more clearly by reference to Fig. 2, which shows hysteresis loops for a magnetic material having high magnetic retentivity. In Fig. 2 ordinates represent induction or magnet flux and abscissae represent magnetizing force.

If a magnetic element made up of a magnetic material represented by Fig. 2 is introduced into a magnetic field in an unmagnetized condition, as the magnetic field increases in intensity, the induction of the magnetic element increases along the curve A of Fig. 2. If the magnetic field produces a magnetizing force represented by the abscissa OB, the induction of the magnetic element increases until the point C on the curve A is reached. Upon removal of the magnetic element from the magnetic field, the induction of the magnetic element follows a hysteresis curve D until a point E is reached. A measurement of the residual induction of the magnetic element gives a value corresponding to the ordinate OE of Fig. 2, and this ordinate indicates that the magnetic element has been subjected to a magnetizing force having the value OB. From these facts, the current producing the magnetizing force OB can be ascertained.

If the magnetic element in an unmagnetized condition is subjected to a magnetic field represented by an abscissa OF in Fig. 2, the induction of the magnetic element increases along the curve A until a point G is reached and when the magnetic element is removed from the magnetic field, the induction follows a curve H until a point J is reached. Measurement of the residual induction of the magnetic element then indicates a residual induction corresponding to the ordinate OJ and this, in turn, indicates that the magnetic element has been subjected to a magnetizing force corresponding to the abscissa OF. From these facts the current producing the magnetizing force OF can be ascertained. By continuing the analysis along the line herein presented, it will be seen that for each current producing a magnetic field a specific magnetizing force will be applied to a magnetic element and a specific residual induction will be retained by the magnetic element. Consequently, the residual induction of the magnetic element may be employed as a measurement for the current producing the magnetic field.

When the magnetic element subjected to a magnetizing force includes an air gap, as usually is the case, an allowance for the magnetomotive drop across the air gap must be made in determining from the residual induction the value of the current producing the magnetic field. This allowance may be provided in the calibration data for the magnetic element.

A specific magnetic element selected for measuring purposes may vary appreciably in shape and material. Preferably, a material having a high magnetic retentivity is employed. Typical of these materials is a hard magnetic steel such as spring steel. Alternatively one of the cobalt containing magnetic steels may be employed if a still higher magnetic retentivity is desired. As a further example, one of the more recent magnetic steels containing aluminum, cobalt and nickel may be employed.

It will be noted that the magnetic element may be subjected to rapid variations in field strength. For this reason it is desirable to so design the magnetic element that eddy currents will be minimized. Consideration has been given to a continuous magnetic element or rim which is moved through the magnetic field, but a continuous magnetic element is objectionable for the reason that the eddy currents formed therein are excessive and for the further reason that localization of indications corresponding to different points in a wave of electrical current is difficult. Consequently, we prefer to employ a plurality of discrete magnetic elements. In order to keep eddy currents within reasonable limits, each magnetic element is formed of a thin strip of magnetic material. The thinness of the strip depends to some extent upon the rate of change of the magnetic field with respect to time. When a magnetic strip is to be passed through a magnetic field in 30 micro-seconds, we have found that a thickness of .008" is satisfactory. If the rate of change of the magnetic field with respect to time is greater, a thinner magnetic strip may be required. On the other hand, if the rate of change is lower, a thicker magnetic strip may be employed.

Figures 3, 4:
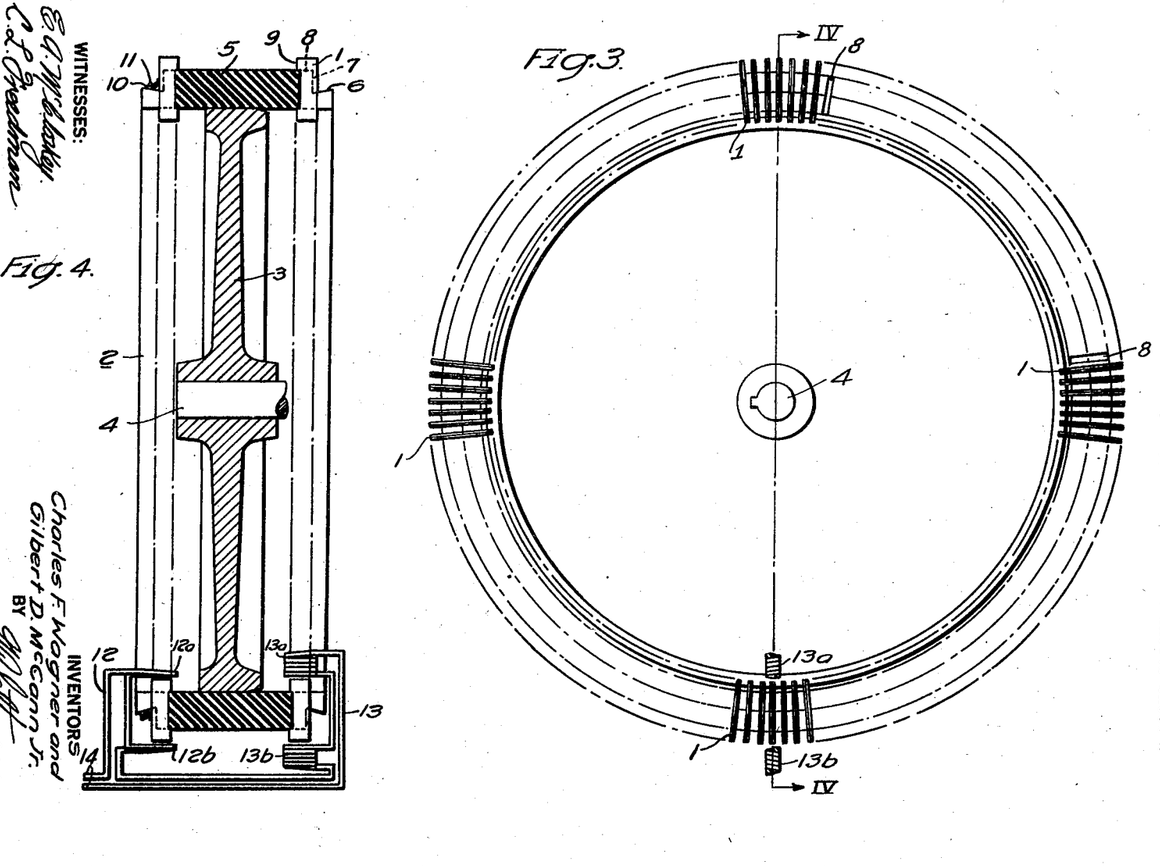
Fig. 3 is a view in front elevation of an instrument for moving a plurality of magnetic elements through an electrical field designed in accordance with our invention.
Fig. 4 is a view in section taken along the line III—III of Fig. 3.

To facilitate movement of a plurality of magnetic strips successively through a magnetic field, we mount a plurality of magnetic strips 1 uniformly around the periphery of a cylindrical drum 2 (Figs. 3 and 4). For purposes of illustration, only a portion of the magnetic strips are shown in Figs. 3 and 4. Conveniently, this drum may be formed of a central disc or hub 3 which is mounted for rotation on a shaft 4. The strips 1 are mounted on a cylindrical rim 5 which may be pressed on the hub 3 and held in place by suitable pins or screws not shown. The materials of which these members are formed may vary appreciably; preferably the rim 5 is made of a non-magnetic material. For reducing the formation of eddy currents, the rim 5 further may be made of a non-electro-conductive material. An example of a suitable material for this purpose is a phenol-formaldehyde resin which may be employed with suitable fillers or laminations of fibrous material as well understood in the art. The hub 3 may be formed of similar material or may be formed of metal if desired.

In order to support the magnetic strips 1, each edge of the cylindrical rim 5 is notched to provide a conical surface 6 which terminates in a plane surface 7. At equally spaced intervals around the edge of the cylindrical member, radial notches 8 are cut in the cylindrical rim for reception of the magnetic strips 1. One of the slots 8 is shown in Fig. 3 with its magnetic strips removed. As above indicated, the proportions may vary appreciably according to the specific information desired and the specific quantity to be measured. In a typical design, an edge of the cylindrical rim 5 may be provided with 330 equally spaced notches each .032" thickness. In each of the notches 8, four magnetic strips 1 may be placed, each of the strips being approximately .008" in thickness. This laminated construction is effective for restricting eddy currents produced during the operation of the instrument.

As shown in Fig. 4, each strip is made of an elongated strip of magnetic material having a projection 9 at each end which extends slightly over the cylindrical rim 5 for preventing radial movement of the strip 1. The strips may be locked in place in any convenient manner as by winding a strip of insulating ribbon or tape such as fish paper 10 in the angle formed between the conical surface 6 and the magnetic strips 1, and fastening this in place by cord or twine 11. Such attaching means may be readily applied and removed for permitting removal and replacement of the magnetic strips. In order to illustrate the rim assembly clearly, only a portion of the magnetic strips are shown in detail.

For successively magnetizing the magnetic strips 1, a pair of fixed coils 12 and 13 may be positioned adjacent the path traversed by the magnetic strips during rotation of the cylindrical rim 5. It is to be noted that the cylindrical rim 5 is provided with two separate rows of magnetic strips in order to obtain different ranges of energization for the magnetic strips. To this end, the coil 12 is made up of a single turn 12a positioned adjacent the path traversed by one end of the magnetic strips in one of the rows and a second single turn 12b positioned adjacent the path travelled by the other end of the magnetic links. The turns 12a and 12b are so wound that they aid in the production of a magnetic field passing through each magnetic strip as each magnetic strip moves between the turns.

The coil 13 is a multi-turn coil provided with five turns 13a adjacent the path travelled by one end of the magnetic strips in the right-hand row as viewed in Fig. 4, and five turns 13b positioned adjacent the path travelled by the other end of the magnetic strips. All of these turns are so wound that they aid in the formation of a magnetic field traversed by the magnetic strips in the right-hand row. Because of the difference in the numbers of turns provided in the coils 12 and 13, the magnetic fields produced thereby will differ in intensity. As a specific example, the magnetic strips passing between the turns of the coils 12 may be designed to be magnetized suitably in response to currents ranging from 2000 to 20,000 amperes, whereas the magnetic strips passing between the turns of the coil 13 may be designed to respond to currents between 200 and 2000 amperes. Additional rows of magnetic strips and different numbers of turns in the magnetizing coils may be employed as desired.

By reference to Fig. 3, it will be noted that the coils are so shaped as to confine their magnetic fields substantially to paths corresponding in width to the width of one of the slots 8. This is for the purpose of confining the magnetization of each of the strips 1 to as small a portion of the electrical surge of other quantity being measured as possible.

It is believed that the operation of the apparatus illustrated in Figs. 3 and 4 will be apparent from the foregoing discussion. When it is desired to measure the wave form of a surge traversing a circuit 14, this circut is connected to the coils 12 and 13 so that magnetic fields are produced across the paths traversed by the magnetic strips which vary in intensity with the current being measured. The coils 12 and 13 may be connected to the circuit in any suitable manner, as in series. It is to be understood that during a measurement the cylindrical rim 5 is kept in continuous rotation on its shaft 4 at any convenient speed such as 6000 R. P. M. At such a speed and with 330 slots in each edge of the cylindrical rim 5, the magnetic strips contained in each slot will pass through the magnetic fields produced by the coils 12 and 13 at intervals of approximately 30 microseconds. If the magnetic strips 1 are mounted on the rim 5 in an unmagnetized condition, during their passage through the coils 12 and 13 they will be magnetized to an extent dependent upon the strength of the magnetic field at the instant of their passage therethrough, and each magnetic strip will retain a residual induction corresponding to the strength of the magnetic field at the time the magnetic strip passes therethrough.

After the electrical surge has been applied, the residual induction of the magnetic strips 1 in each slot is measured either on the magnetic rim 5 or detached therefrom. Removal of the magnetic links may be accomplished readily by cutting the cords 11 and removing the ribbon 10 from the cylindrical rim 5. By plotting the residual induction of each of the magnetic strips as ordinates against time as abscissae, a curve corresponding to the curve of Fig. 1 may be obtained. Instead of residual induction, the measurements of the magnetic strips may be expressed directly in terms of current.

Measurement of the residual induction of each magnetic strip 1 may be accomplished by apparatus well known in the art. This has been represented diagrammatically in Fig. 5, wherein a measuring instrument 15 is provided with magnetic extensions 16 against which each magnetic strip or group of four strips in succession may be placed. The residual induction of the magnetic strip 1 then may be read from the scale of the measuring instrument which, if desired, may be calibrated in terms of current producing the magnetic field through which the strip passes.

Figures 5, 6, 12:
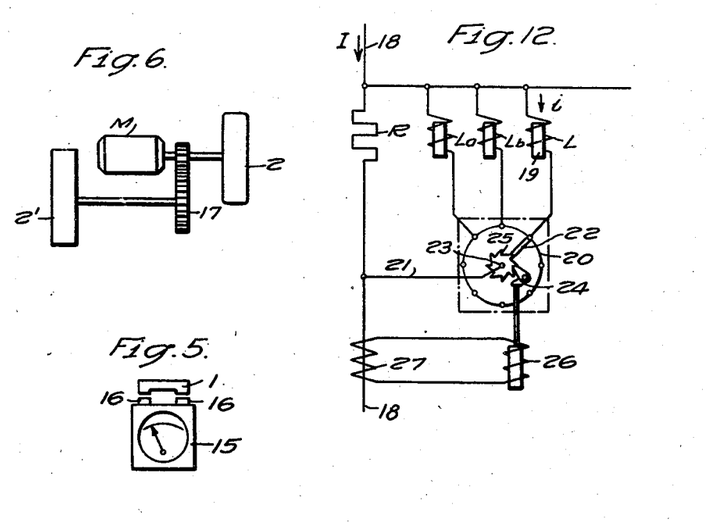
Fig. 5 is a detail view of an instrument for measuring residual induction of a magnetic element.
Fig. 6 is a diagrammatic view of means for rotating a plurality of instruments designed in accordance with our invention.
Fig. 12 is a diagrammatic view of a modified form of our invention for measuring the integral of the current in an electrical surge relative to time.

If the shaft 4 supporting the cylindrical rim 5 rotates at a speed of 6000 R. P. M. and a number of electrical surges are applied to the coils 12 and 13, it is apparent that some overlapping of the records for the surges will result. If desired, a relay such as an overcurrent relay may be included in the circuit 14 in order to interrupt the circuit after the passage of a single electrical surge in order to prevent the overlapping of records. This problem in many cases may, however, be solved by the construction shown in Fig. 6, wherein two cylindrical drums 2 and 2' are rotated at different speeds. For example, one of the cylindrical drums 2 may be rotated at a speed of 6000 R. P. M. from a motor M provided with suitable gearing and the second cylindrical drum 2' may be rotated at 60 R. P. M. through suitable gearing 17. The magnetizing coils 12 and 13 for both of the drums of Fig. 6 are connected in a circuit in any suitable manner, as in series. If a plurality of electrical surges are applied to these coils, the number of surges may be ascertained by a study of the magnetic strips on the 60 R. P. M. cylindrical drum. The number of electrical surges as ascertained from this drum then will assist in the analysis of the records obtained from the high speed cylindrical drum 2.

Figures 7, 8, 9:
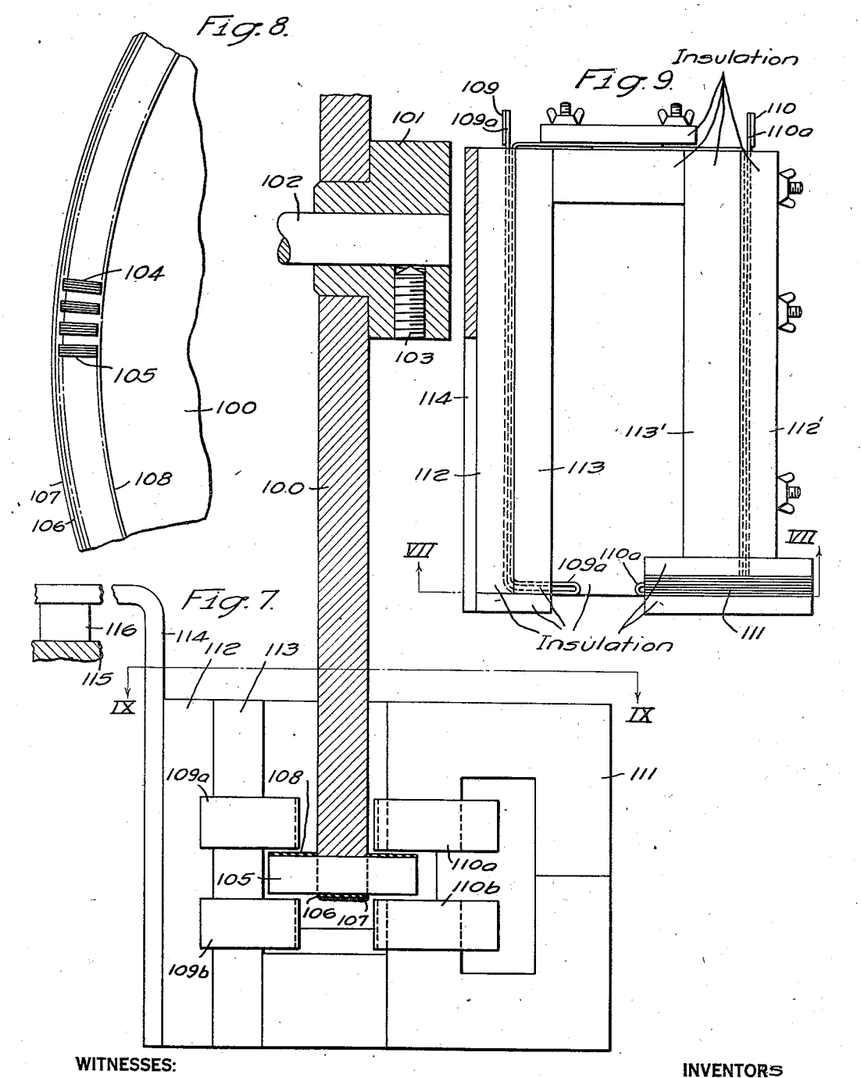
Fig. 7 is a view in cross-sectional elevation of a modification of our invention taken along the line VII—VII of Fig. 9.
Fig. 8 is a fragmentary view in front elevation showing the construction of a disc assembly employed in the modification of Fig. 7.
Fig. 9 is a view taken along the line IX—IX of Fig. 7 with the disc assembly omitted.

An alternative construction for a magnetic strip holder is illustrated in Figs. 7, 8 and 9. In this construction, a disc 100 is provided with a rigidly attached hub 101 which may be attached to a shaft 102 by means of a setscrew 103 or any other suitable attaching means. The disc 100 may be constructed of various rigid materials, aluminum being satisfactory for this purpose. Around the periphery of the disc 100, a plurality of evenly spaced slots 104 is provided for receiving magnetic strips 105. As above indicated, the thickness of the magnetic strips preferably is restricted in accordance with the rate of change of the magnetic field through which the magnetic strips are to be advanced. For measurements similar to those heretofore described, the strips 105 may have a thickness of .008 of an inch and four of the strips may be placed in each slot.

It will be noted that the strips 105 shown in Figs. 7 and 8 have no protuberances for holding them in place. In order to secure the strips to the disc 100, a ribbon of insulating material such as fish paper 106 may be wrapped around the periphery of the disc after the magnetic strips 105 have been inserted in the slots 104. A winding of string or cord 107 then may be applied over the fish paper to secure the assembly in place. Friction and warpage losses may be decreased by cementing or otherwise attaching to the interior surfaces of the strips 105 ribbons of fish paper 108.

Referring to Fig. 7, it will be noted that the strips 105 project appreciably from each face of the disc 100. In the modification shown in Fig. 7, a separate magnetic field is established for each of the projecting portions of the magnetic strips. To this end a pair of current coils 109 and 110 is mounted with one coil on each side of the disc 100. The coil 109 has a single turn 109a positioned above one point in the path traversed by the left-hand projection of the magnetic strips 105 as viewed in Fig. 7, and has a second single turn 109b positioned below this point. These turns are suitably connected, as in parallel, to assist in producing a magnetic field traversing the magnetic strips in a direction radial from the shaft 102.

The coil 110 resembles the coil 109 and has single turns 110a and 110b positioned on opposite sides of the right-hand projections of the magnetic strips 105 as viewed in Fig. 7. In addition, however, an auxiliary magnetic structure 111 is provided for decreasing the magnetic reluctance for the magnetic field established by the coil 110. Preferably the magnetic structure 111 is made up of generally U-shaped laminations of a magnetic material having a low coercive force and low hysteresis loss such as that described in Patent No. 1,807,021. Certain of the laminations may extend within the turns 110a and 110b into proximity to the portions of the magnetic strips passing therethrough. Because of the magnetic structure 111, the intensity of the magnetic field traversing the right-hand projections of the magnetic strips is larger than that of the magnetic field traversing the left-hand projections of the magnetic strips. Consequently, with the same currents traversing the various turns the magnetic record left in the right-hand portions of the magnetic strips cover a lower current range than that for the left-hand projections of the magnetic strips.

The coils 109 and 110 may be mounted in any suitable manner. In Fig. 7 the coil 109 is mounted between two sheets 112 and 113 of insulating material. These sheets are attached to a bracket 114 which, in turn, is mounted on a support 115, and which may be employed for holding an electric motor connected to the shaft 102 for rotating the disc 100. Preferably the bracket 114 is attached to the support 115 through resilient pads 116 such as rubber pads. The coil 110 may be mounted in a similar manner between sheets 112' and 113'. Preferably the coils and their supporting structures are separable to facilitate assembly of the instrument. For this purpose screws having detachable wing nuts may be employed for holding the various parts together.

Figure 10:
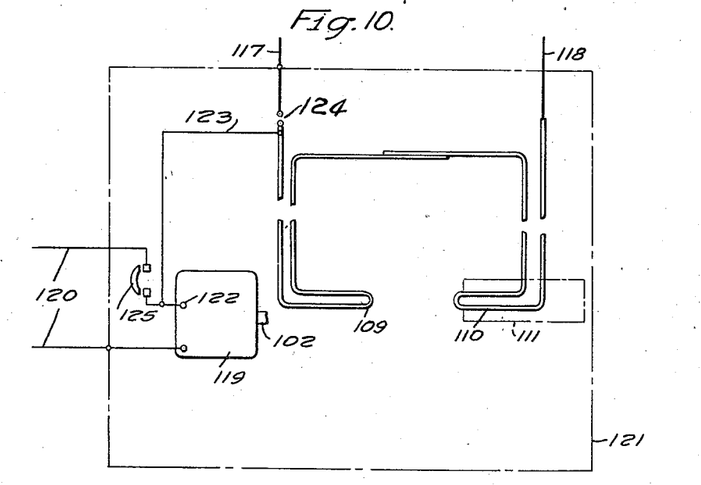
Figs. 10 and 11 are circuit diagrams showing typical electrical connections for instruments designed in accordance with our invention.

The circuit connections for the coils 109 and 110 may be seen more clearly by reference to Fig. 10. In Fig. 10 an electrical surge to be measured enters the coils 109 and 110 through conductors 117 and 118. As above noted the terminals on each coil may be connected in parallel. One terminal of each coil is connected to one of the conductors 117 and 118 and the remaining terminals of the coils are connected together. The motor 119 for driving the disc 100 is energized from an electrical source 120 which may be a conventional 110-volt alternating-current source. Preferably the entire instrument is enclosed in a shielding casing 121 which is formed of an electro-conductive material. As illustrated in Fig. 10, one conductor of the source 120 is grounded to the casing and the conductor 117 also is grounded to the casing.

In obtaining a record of an electrical surge, it is desirable that the instrument be disconnected at the end of the first electrical surge to be applied thereto. In order to obtain such an operation, we connect one terminal 122 of the motor to a terminal of the coil 109 through a conductor 123. Between the conductor 123 and the point of grounding of the conductor 117, a gap 124 is provided which withstands low potentials of the order of those applied to the motor such as 110 volts, but which breaks down at higher potentials and becomes conducting when an electrical surge is applied through the conductors 117 and 118. A suitable gap for this purpose may be constructed by placing a thin strip of paper between a pair of electrodes.

It will be understood that during normal operation of the instrument the motor is in continuous operation. When an electrical surge is applied through the conductors 117 and 118 magnetic fields are set up by the coils 109 and 110 to leave a magnetic record on the magnetic strips 105. In passing through the coils 109 and 110 the electrical surge breaks down the gap 124 and causes it to become conducting. This establishes a short-circuit across the motor which may be traced from the point of grounding of the conductor 117 through the conductor 123 to the terminal 122 and through the remaining motor terminal to ground.

By placing an over-current circuit breaker 125 between the motor and its energizing source, the effect of the short circuit applied across the motor terminals is to cause opening of the circuit breaker. When the circuit breaker 125 opens it deenergizes the motor 119 and the motor consequently remains at rest until it is manually re-started by closure of the circuit breaker.

If additional electric surges are applied to the conductors 117 and 118 while the motor is at rest, the magnetic fields established by these additional electric surges influence only a few of the magnetic strips 105 which remain adjacent the coils 109 and 110 while the motor is at rest. By marking these magnetic strips, the investigation of an electric surge may be restricted to those magnetic strips which have been influenced only by the first electric surge.

Figure 11:
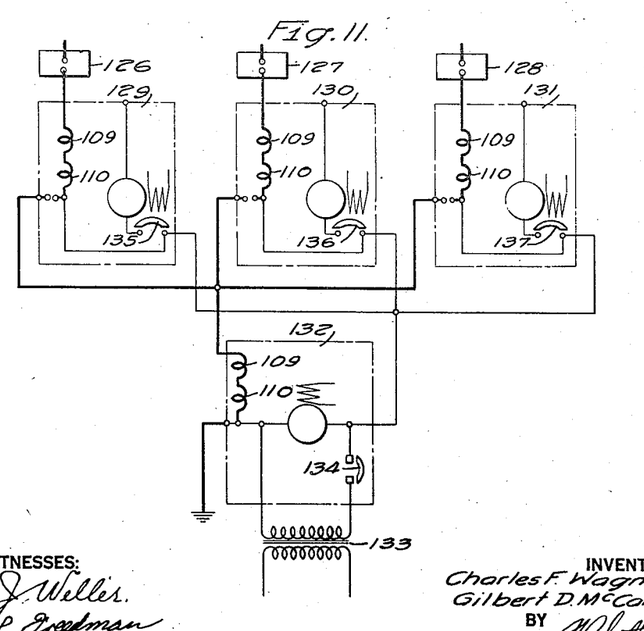

A further application of instruments designed in accordance with our invention is shown in Fig. 11. In this figure three lightning arresters 126, 127 and 128 are illustrated and represent the lightning arresters for a three-phase circuit. The discharge from these arresters is led respectively through three instruments 129, 130 and 131 which correspond to the instrument illustrated in Figs. 8 to 10, inclusive. It will be noted that the discharge current from each arrester traverses the coils 109 and 110 of one of the instruments and that three currents from the three arresters, after passing through the coils, are conducted to a ground connection through the coils of an additional instrument 132. Preferably the instruments 129, 130 and 131 are high speed instruments intended to show the characteristics of a particular electrical surge. The instrument 132 may be a low speed instrument for indicating the number of electrical surges or additional information about the electrical surges. As illustrated in Fig. 11, the motors for the four instruments are energized through an insulating transformer 133. Since all motors are energized from a single source of energy, if it is desired to stop the motors after a single electric surge, a circuit breaker 134 may be employed for opening the energizing circuit for all of the motors. Moreover, since the current supplied to the instrument 132 must pass through one of the instruments 129, 130 and 131 a gap need not be provided for the instrument 132. When an electric surge strikes any one of the arresters 126, 127 and 128, the passage of the electric surge through the high speed instrument associated with that arrester breaks down the gap for the instrument and establishes a short-circuit across the motor supply circuit. Consequently, the circuit breaker 134 being an overload circuit breaker, opens to deenergize all of the motors. In order to facilitate starting of the various motors, manually operable circuit breakers or switches 135, 136 and 137 may be provided for the high speed instruments.

The embodiments thus far considered have been directed to a reproduction of the wave form of an electrical surge or other quantity to be measured. If it is desired to obtain a quantity representing the area subtended by the curve of Fig. 1, that is the integral of current relative to time, the embodiment illustrated in Fig. 12 may be employed.

In Fig. 12 a conductor 18 is illustrated which carries an electrical surge which is to be studied. To this end, a non-inductive resistance R is connected to the conductor 18 and the potential drop across this resistance is applied across an inductance coil L. The inductance coil L is wound with such a diameter that a magnetic element 19 having a high magnetic retentivity may be placed therein.

In order to study the performance of the circuit illustrated in Fig. 12, the surge current passing through the conductor 18 may be designated by the reference character I and the current diverted through the inductance coil L may be designated by $i$. If the inductance of the inductance coil L is high compared to the resistance R, so that the current $i$ through the inductance coil is negligible compared to the surge current I, then the following relationship holds true:

$$RI = L\frac{di}{dt}$$

or $$i = \frac{R}{L}\int I\,dt$$

Since R and L are constants it follows that the $\int I\,dt$ for an electrical surge is represented by the maximum current through the inductance coil L. It will be noted that the magnetic element 19 positioned within the inductance coil L will retain a residual induction which corresponds to the maximum value of current passing through the inductance coil. Consequently, a measurement of the residual induction of the magnetic element 19 will indicate the maximum current passing through the inductance coil L and is representative of the $\int I\,dt$.

In order to measure the integral for successive electrical surges, a plurality of inductances $L_a$ and $L_b$ together with the inductance coil L may be connected to the contact points of a commutator 20. For purposes of illustration only three inductance coils are shown, but it is to be understood that one inductance coil may be employed for each of the contact points of the commutator. The connection from the conductor 18 to the inductance coils L may be supplied through a conductor 21 which is connected to a rotatable brush 22.

As illustrated, rotation of the brush 22 is effected by a pawl mechanism 24 which engages a ratchet 25 mounted on a shaft 23. The pawl mechanism 24 is actuated upwardly by means of a solenoid 26 which is energized directly from the conductor or from a current transformer 27 associated with the conductor 18. Consequently, each electrical surge is effective to energize the magnetic element positioned in one of the inductance coils and to shift the brush 22 in order to introduce another inductance coil for measurement of a successive electrical surge. Generally, the inertia of the parts will delay movement of the brush 22 sufficiently to permit a recording of the electrical surge by a magnetic element 19 before a movement of the brush takes place. If desired, however, a time delay may be incorporated in the solenoid 26 in a manner well understood in the art.

In operation, a surge passing through the conductor 18 establishes a potential drop across the resistor R which, in turn, results in a current flow through the inductance coil L. The current flow through the inductance coil L magnetizes the magnetic element 19 which has been placed in an unmagnetized condition in the coil and leaves the magnetic element with a residual induction corresponding to the maximum value of current passing through the inductance coil. The electrical surge also operates through the transformer 27 the solenoid 26, the pawl mechanism 24 and the ratchet 25 to advance the brush 22 in order to bring a second inductance coil $L_b$ into circuit. By removing the magnetic element 19 from the inductance coil L and measuring the residual induction thereof as by means of an instrument corresponding to the instrument 15 of Fig. 5, an indication proportional to the integral of surge current with reference to time is obtained, and if desired the measuring instrument may be calibrated to give this integral directly.

Although we have described our invention with reference to certain specific embodiments thereof, it is obvious that numerous modifications thereof are possible. Therefore, we do not wish our invention to be restricted except as required by the following claims when interpreted in view of the prior art.

We claim as our invention:

1. In an instrument responsive to substantially instantaneous values of a variable electrical quantity, a plurality of magnetic elements having high magnetic retentivities, said magnetic elements being in a substantially unmagnetized condition, and means for placing said magnetic elements successively in a magnetic field at predetermined time intervals, each of said magnetic elements comprising a laminated group of magnetic bodies.

2. In an instrument responsive to substantially instantaneous values of a variable electrical quantity, a supporting device, a plurality of spaced magnetic elements having high magnetic retentivities on said supporting device, said magnetic elements being in a substantially unmagnetized condition, and means for producing a magnetic field, said supporting device and said means being relatively movable for successively subjecting said retentive magnetic elements to said magnetic field, each of said magnetic elements comprising a laminated group of magnetic bodies.

3. In a current responsive instrument responsive to substantially instantaneous values of a variable electrical quantity, a supporting device mounted for rotation about an axis, a plurality of substantially unmagnetized magnetic elements having high magnetic retentivities on said supporting device, said magnetic elements being spaced around said axis for rotation thereabout, current responsive means for producing a magnetic field in the path of movement of said magnetic elements, and means for rotating said supporting device relative to said magnetic field for successively introducing said magnetic elements in said magnetic field, each of said magnetic elements comprising a laminated group of magnetic bodies.

4. In an instrument for determining the wave form of a variable magnetic field having a duration substantially less than one second, a plurality of magnetic elements having high magnetic retentivities, said magnetic elements being in a substantially unmagnetized condition, and means for successively placing said magnetic elements in said variable magnetic field at different points in a wave of said variable magnetic field, said means being effective for exposing said magnetic elements to said magnetic field at time intervals sufficiently short to provide an accurate record of the wave form of said magnetic field.

5. In instrument for measuring the wave form of a variable magnetic field having a duration substantially less than one second, a supporting device rotatable about an axis, and a plurality of magnetic elements having high magnetic retentivities positioned on said supporting device at spaced intervals around said axis, said magnetic elements being in a substantially unmagnetized condition, said means being effective for exposing said magnetic elements to said magnetic field at time intervals sufficiently short to provide an accurate record of the wave form of said magnetic field.

6. In an instrument for measuring the wave form of a variable magnetic field having a duration substantially less than one second, a supporting device rotatable about an axis, a plurality of magnetic elements having high magnetic retentivities positioned on said supporting device at spaced intervals around the periphery of said supporting device, said magnetic elements being in a substantially unmagnetized condition, and, being magnetically insulated from each other, and a coil positioned adjacent said supporting device for establishing a magnetic field through which said magnetic elements pass, said means being effective for exposing said magnetic elements to said magnetic field at time intervals sufficiently short to provide an accurate record of the wave form of said magnetic field.

7. In an instrument for measuring the wave form of a variable magnetic field, a supporting device rotatable about an axis, a plurality of magnetic elements having high magnetic retentivities positioned on said supporting device at spaced intervals around the periphery of said supporting device, said magnetic elements being in a substantially unmagnetized condition, and being magnetically insulated from each other, and a coil positioned adjacent said supporting device for establishing a magnetic field through which said magnetic elements pass, said coil being proportioned to direct a majority of its magnetic flux through an area substantially equal to the area occupied by one of said magnetic elements.

8. In a device for measuring an electrical surge, a first group of magnetic elements having a high magnetic retentivity, said magnetic elements being movable relative to a magnetic field established by said electrical surge at a predetermined rate for subjecting said magnetic elements successively to said magnetic field, a second group of magnetic elements, said second group of magnetic elements being movable relative to a magnetic field established by said electrical surge at a rate differing from said predetermined rate for subjecting the magnetic elements of said second group successively to a magnetic field produced by said electrical surge, and means for producing said different relative motions.

9. In a device for measuring an electrical surge, a pair of groups of magnetic elements having high magnetic retentivities, and means for subjecting said magnetic elements to magnetomotive forces controlled by said electrical surge, a first one of said groups of magnetic elements cooperating with said means for establishing a retained magnetism record for a low value electrical surge, and a second one of said groups of magnetic elements cooperating with said means for establishing a retained magnetism record for a high value electrical surge.

10. In a device for measuring an electrical surge, a first electrical conductor connected for energization in accordance with said electrical surge, a second electrical conductor connected for energization in accordance with said electrical surge, said conductors being designed to produce magnetic fields having different values, and magnetic means of high magnetic retentivity disposed for energization by said magnetic fields.

11. In a device for measuring an electrical surge, a first electrical conductor connected for energization in accordance with said electrical surge, a second electrical conductor connected for energization in accordance with said electrical surge, said conductors being designed to produce magnetic fields having different values, and magnetic means of high magnetic retentivity disposed for energization by said magnetic fields, said magnetic means comprising a first portion of magnetic elements having high magnetic retentivity successively movable through one of said magnetic fields, and a second portion of magnetic elements having high magnetic retentivity successively movable through the other of said magnetic fields.

12. The method for determining the wave shape of a variable magnetic field which comprises successively subjecting a plurality of individual magnetic elements having high magnetic retentivity in a substantially unmagnetized condition to said magnetic field, whereby said magnetic elements are magnetized to different degrees, and measuring the magnetic strength of each of said magnetic elements.

13. The method for determining the wave shape of a variable electrical current which comprises magnetizing a plurality of sets of magnetc elements having high magnetic retentivities to different degrees bearing predetermined relationships to the values of said variable electrical current, measuring the magnetizations of said magnetic elements, and selecting data from that set of magnetic elements magnetized within its normal operating range for analyzing said variable electrical current.

14. The method for analyzing a variable electrical surge current which comprises successively placing in a magnetic field controlled by said variable electrical current a plurality of magnetic elements having high magnetic retentivities, and successively removing said magnetic elements from said magnetic field.

15. The method for analyzing the wave form of a variable magnetic field which comprises magnetizing a first magnetic element having a high magnetic retentivity in accordance with the value of a first portion of the wave form of said magnetic field, magnetizing a second magnetic element similar to said first magnetic element in accordance with the value of a second portion of the wave form of said magnetic field, and measuring the magnetization of said magnetic elements.

16. The method of analyzing the wave form of an electrical surge which comprises moving a first set of magnetic elements having a high magnetic retentivity at a predetermined rate relative to a magnetic field controlled by said electrical surge for successively magnetizing said magnetic elements, moving a second set of magnetic elements having a high magnetic retentivity relative to a magnetic field controlled by said electrical surge at a rate differing from said predetermined rate for magnetizing the magnetic elements of said second set, and measuring the magnetizations of said elements.

17. In an instrument, a cylindrical member having a non-magnetic rim portion mounted for rotation about an axis, and a plurality of magnetic elements mounted in spaced relationship around said rim, said magnetic elements having a high magnetic retentivity and being in an unmagnetized condition, and each of said magnetic elements comprising a laminated group of magnetic bodies.

18. In an instrument, a cylindrical member having a non-magnetic rim portion mounted for rotation about an axis, a plurality of magnetic elements mounted in spaced relationship around said rim, said magnetic elements having a high magnetic retentivity and being in an unmagnetized condition, and a coil positioned to pass magnetic flux across the path of movement of said magnetic elements, each of said magnetic elements comprising a laminated group of magnetic bodies.

19. In an instrument, a cylindrical member having a non-magnetic rim portion mounted for rotation about an axis, a first set of magnetic elements having magnetic retentivity mounted in a row around said rim, and a second set of magnetic elements having magnetic retentivity mounted on said member in a row concentric about said axis, each of said magnetic elements comprising a laminated group of magnetic bodies.

20. In an instrument, a cylindrical member having a non-magnetic rim portion mounted for rotation about an axis, a first set of magnetic elements having magnetic retentivity mounted in a row around said rim, a second set of magnetic elements having magnetic retentivity mounted on said member in a row concentric about said axis, a first coil means positioned to pass magnetic flux across the path of movement of said first set of magnetic elements, and a second means positioned to pass magnetic flux across the path of movement of said second set of magnetic elements, said first and second coil means being proportioned to produce different values of magnetic flux when energized from a common source of electrical energy.

21. In an instrument, a cylindrical member having a non-magnetic rim portion mounted for rotation about an axis, a plurality of magnetic elements mounted in spaced relationship around said rim, said magnetic elements having a high magnetic retentivity and being in an unmagnetized condition, a second cylindrical member having a non-magnetic rim portion mounted for rotation about an axis, and a plurality of magnetic elements having magnetic retentivity mounted around the rim of said second cylindrical member, and means for rotating said members at relatively different rates.

22. In an instrument, a plurality of magnetic elements having high magnetic retentivities, said magnetic elements being in a substantially unmagnetized condition, and means for placing said magnetic elements successively in a magnetic field comprising a resistor for carrying a current to be measured, a plurality of windings having high inductances for producing magnetic fields, and means for successively connecting said windings across said resistor, said magnetic elements being positioned in said windings.

23. In an instrument for measuring a current passing through a conductor, a resistor connected for energization by said current, a high inductance connected for energization in accordance with the potential drop across said resistor, and means for determining the maximum current passing through said inductance.

24. In an instrument for measuring a current passing through a conductor, a resistor connected for energization by said current, a high inductance connected for energization in accordance with the potential drop across said resistor, and means for determining the maximum current passing through said inductance, said last named means including a magnetic element having high magnetic retentivity positioned in the magnetic field produced by current traversing said high inductance.

25. The method for measuring the integral of current with respect to time of an electrical surge which comprises passing through a conductor an electrical current bearing a predetermined relationship to said integral, measuring the maximum value of said current, and computing from said maximum value the value of said integral.

26. The method for measuring the integral of current with respect to time of an electrical surge which comprises passing through a conductor an electrical current bearing a predetermined relationship to said integral, placing a magnetic element having a high magnetic retentivity in the magnetic field established by current flowing through said conductor, measuring the residual induction left in said magnetic element by said current, and computing from said residual induction measurement the value of said integral.

27. In an instrument, a supporting member, a plurality of unmagnetized, retentive magnetic elements mounted in a row at spaced positions on said supporting member, and means for detachably securing said magnetic elements to said supporting member.

28. In an instrument, a supporting, cylindrical member having a plurality of radial slots spaced about its periphery, a plurality of unmagnetized, retentive magnetic elements positioned in said slots and having ends projecting axially from said cylindrical member, and means for detachably securing said magnetic elements to said supporting member including a cord wrapped therearound.

29. In an instrument, a supporting, rotatable cylindrical member having a plurality of radial slots spaced about its periphery, a plurality of unmagnetized, retentive magnetic elements positioned in said slots and projecting from each end of said cylindrical member, means for establishing a magnetic field across the path traversed by the portions of said magnetic elements projecting from a first end of said cylindrical member, and means for establishing a magnetic field across the path traversed by the portions of said magnetic elements projecting from a second end of said cylindrical member during rotation of said cylindrical member.

30. In an instrument, means for producing a magnetic field, means for successively moving unmagnetized, retentive magnetic elements through said magnetic field, and means responsive to the production of said magnetic field for interrupting the operation of said instrument.

31. In an instrument for measuring an electrical surge, means for producing a magnetic field controlled by said electrical surge, a plurality of unmagnetized, retentive magnetic elements, a source of electrical energy, electromotive means connected for energization from said source for successively moving said magnetic elements through said magnetic field, and means responsive to said electrical surge for interrupting operation of said electromotive means including spaced electrodes connected across said source and included in the discharge path for said electrical surge, the gap between said electrodes being effective for conducting electrical current from said source only after an electrical surge has been applied thereto.

32. In a device for measuring an electrical surge, a plurality of record members each comprising a pair of groups of magnetic elements having high magnetic retentivities, and means for subjecting said magnetic elements to magnetomotive forces controlled by said electrical surge, a first one of said groups of magnetic elements cooperating with said means for establishing a retained magnetism record for a low value electrical surge, and a second one of said groups of magnetic elements cooperating with said means for establishing a retained magnetism record for a high value electrical surge, said means being proportioned to subject successively the magnetic elements associated with a first one of said record members to said magnetomotive forces at a rate differing from that of the magnetic elements associated with a second one of said record members.

CHARLES F. WAGNER.
GILBERT D. McCANN, Jr.